UNITED STATES PATENT OFFICE.

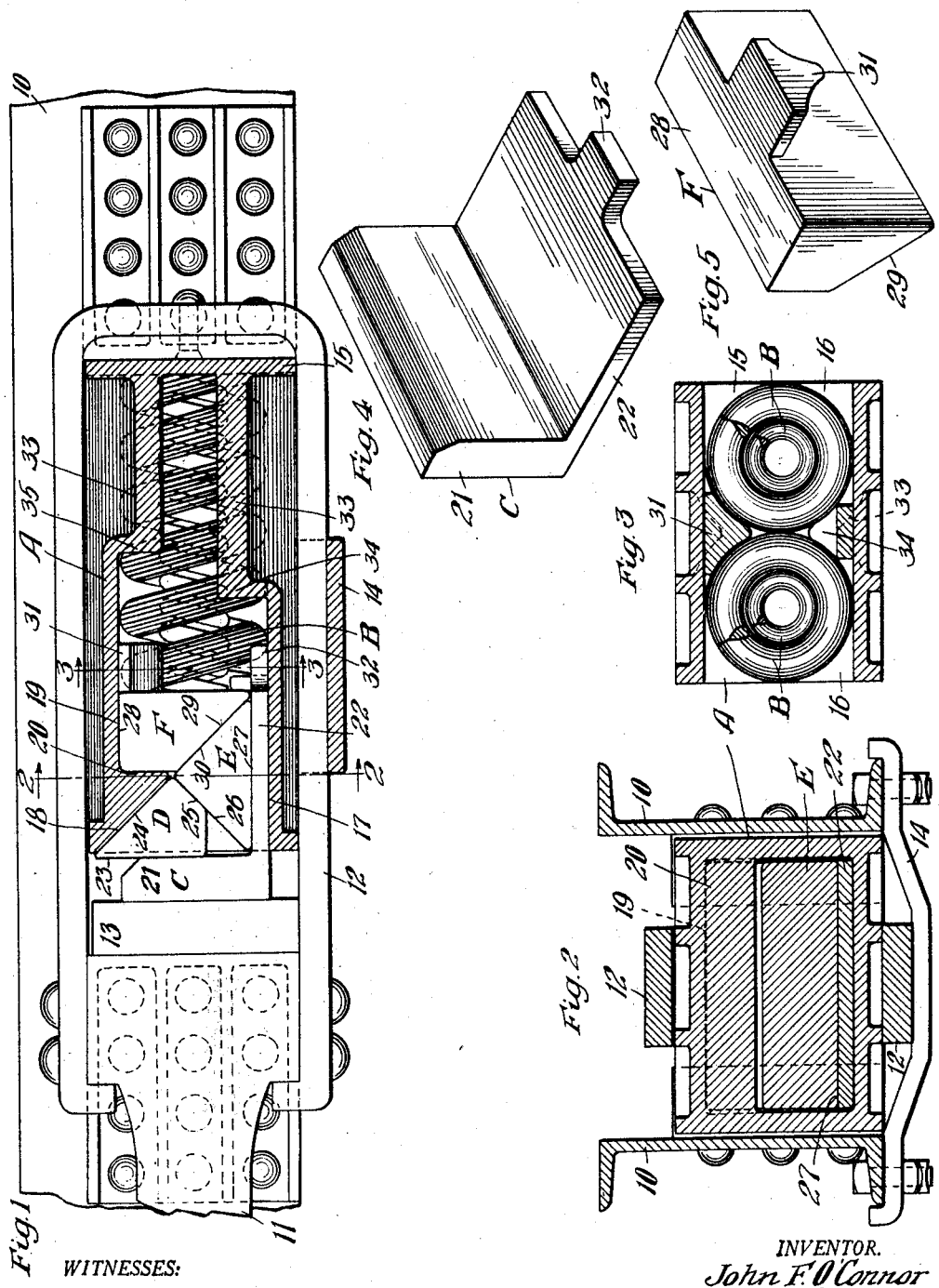

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

1,360,434.     Specification of Letters Patent.     Patented Nov. 30, 1920.

Application filed May 3, 1919. Serial No. 294,444.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

The object of the invention is to provide a friction shock absorbing mechanism especially adapted for railway draft riggings and wherein the mechanism is provided with high capacity, large friction wearing areas and the friction elements so designed that they may be made as simple castings.

Another and more specific object of the invention is to provide a friction shock absorbing mechanism of the character above indicated wherein a differential action is obtained between certain of the friction elements.

In the drawing forming a part of this specification, Figure 1 is a vertical, longitudinal, sectional view of a portion of a railway draft rigging showing my improvements in connection therewith. Fig. 2 is a vertical, transverse, sectional view taken substantially on the line 2—2 of Fig. 1. Fig. 3 is a vertical, transverse, sectional view taken through the shock absorbing mechanism substantially on the line 3—3 of Fig. 1. Figs. 4 and 5 are detail perspectives of two of the friction elements.

In said drawing, 10—10 denote channel-shaped center or draft sills of a railway car, the same being provided on their inner faces with the usual front and rear stops customarily employed in draft riggings. A draw bar is indicated at 11, the same being operatively associated with the shock absorbing mechanism proper by any suitable means such as the strap yoke 12. Within the yoke is provided a front follower 13 and the parts are supported by a detachable saddle plate 14.

The improved shock absorbing mechanism, as shown, comprises, broadly, a combined friction shell and spring casing designated generally by the reference A, horizontal twin-arranged springs B—B, an outer friction member C, a combined friction shoe and wedge D, a second combined friction shoe and wedge E, and a combined friction shoe and spring follower F.

The casting A is formed at its rear end with an integral wall 15 which acts as a rear follower, the rear portion of the casting A being of substantially rectangular form and open at the sides as indicated at 16—16 to permit the insertion laterally of the twin-arranged springs B—B. At its forward end, the casting A is formed with the friction shell proper and is of generally rectangular formation. Said shell has a wide, horizontal, longitudinally extending friction surface 17, an oppositely disposed, inclined friction wedge surface 18, and an inner, flat, horizontally extending friction surface 19 on the same side of the shell as the inclined wedge surface 18 but inwardly thereof. As will be understood from an inspection of Fig. 1, the inclined friction wedge surface 18 provides a shoulder 20 to limit the outward movement of the block F.

The friction member C has a main, transversely extending portion 21 directly engaged by the front follower 13. Said member C is also provided with a rearwardly extended, preferably integral plate section 22 which acts as a friction shoe, the outer face of which frictionally coöperates with the friction surface 17 of the shell.

The combined friction shoe and wedge D has an outer flat face 23 which frictionally coöperates with the inner face of the arm 21 of the member C. The member D is also provided with an outer inclined friction wedge face 24 coöperable with the inclined wedge face 18 of the shell. At its inner end, the member D is formed with an oppositely disposed, inclined friction wedge face 25 coöperating with a corresponding friction wedge face 26 of the member E. The latter on its outer side is provided with a flat friction face indicated at 27 which coöperates with the inner surface of the plate 22.

The shoe follower F is formed on its outer side with a flat friction face indicated at 28 which directly coöperates with the friction face 19 of the shell. On its inner end, the member F is provided with an inclined friction face 29 which coöperates with the corresponding friction face 30 of the block E.

In order to insure proper spacing of the springs B at their ends adjacent the block F, the latter is preferably provided with a rearward substantially triangular-shaped extension 31 shown most clearly in Fig. 3, said extension 31 acting as a spacer for the springs B as will be evident. The plate 22 is also provided with a narrow, rearward extension indicated at 32 in Fig. 4, this performing a somewhat similar function. It will also be noted that the casting A is formed with inwardly extending ribs as indicated at 33—33 forming shoulders 34 and 35 in alinement with the extensions 32 and 31, respectively. The distance between the shoulder 34 and extension 32 and between the shoulder 35 and extension 31 is so regulated that upon completion of the permissible compressive stroke of the mechanism said extensions will come into engagement with the shoulders 34 and 35. While the distance between the respective shoulders and extensions differs, this difference is required on account of the difference in rate of inward travel of the friction member C and block F, as hereinafter explained.

The operation under buff is as follows: As the front follower 13 moves inwardly, the member C will be forced inwardly and friction generated between the plate section 22 thereof and surface 17 of the shell. Simultaneously, the wedge shoe D will travel longitudinally and transversely as it slides over the inclined face 18 of the shell and crosswise of the inner friction face on the arm 21 of the member C. Due to the combined longitudinal and transverse movement of the member D, it is evident that the shoe E will be forced inwardly at a greater speed than the member C thus generating more friction between the coöperable friction surfaces of the plate section 22 and shoe E. If it be assumed that the angle of the inclined friction surface 18 is 45° to the center line of the gear and a similar angle is used for the friction surfaces 25 and 26, it is evident that the friction shoe E will travel inwardly at twice the speed of the member C. As the shoe E is thus forced inwardly, it in turn forces the shoe follower F inwardly against the yielding resistance of the springs B, generating friction between the surfaces 19 and 28 as will be understood. The limit of the compressive stroke is obtained when the extensions 32 and 31 come into contact with the shoulders 34 and 35, respectively, as hereinbefore explained.

It is evident that all of the friction elements C, D, E and F may be readily manufactured at comparatively small expense in the form of ordinary castings, thus minimizing the initial cost of manufacture and reducing the cost of repairs or renewal. I obtain also a relatively large amount of friction surface permitting high capacity with comparatively small amount of wear.

I claim:

1. In a friction shock absorbing mechanism, the combination with a friction shell having a longitudinally extending friction face and an opposed friction face inclined relatively thereto, of a transversely extending friction member, a friction plate movable in unison therewith and coöperable with said longitudinal friction face of the shell, a combined friction wedge and shoe coöperable with said friction member and with the inclined friction face of the shell, another friction shoe interposed between said friction wedge shoe and the plate, and spring means for yieldingly resisting relative movement between the shell and said friction elements.

2. In a friction shock absorbing mechanism, the combination with a friction shell having a longitudinally extending friction face and an opposed friction face inclined relatively thereto, of a transversely extending friction member, a friction plate movable in unison therewith and coöperable with said longitudinal friction face of the shell, a combined friction wedge and shoe coöperable with said friction member and with the inclined friction face of the shell, another friction shoe interposed between said friction wedge shoe and the plate, and spring means for yieldingly resisting relative movement between the shell and said friction elements, said plate being formed integrally with the first named friction member.

3. In a friction shock absorbing mechanism, the combination with a friction shell having a longitudinally extending friction face and an opposed friction face inclined relatively thereto, of an outer friction member having a transversely extending friction face, a friction plate movable in unison with said member and coöperating with the longitudinal friction face of the shell, a combined friction wedge and shoe having surfaces coöperable with said outer friction member and the inclined friction face of the shell and provided with an additional wedge face, another friction shoe having a wedge face coöperable with that of the friction wedge shoe and provided also with a friction face coöperable with the interior face of said plate, and spring means for resisting relative movement between said friction elements and the shell.

4. In a friction shock absorbing mechanism, the combination with a friction shell having a longitudinally extending friction face and an opposed friction face inclined relatively thereto, of an outer friction member having a transversely extending friction face, a friction plate movable in unison with said member and coöperating with the longitudinal friction face of the shell, a combined friction wedge and shoe having surfaces coöperable with said outer friction member and the inclined friction face of the shell and provided with an additional wedge face, another friction shoe having a wedge face coöperable with that of the friction wedge shoe and provided also with a friction face coöperable with the interior face of said plate, spring means for resisting relative movement between said friction elements and the shell, and a follower interposed between said spring means and the last named friction shoe.

5. In a friction shock absorbing mechanism, the combination with a friction shell having a longitudinally extending friction face on one side thereof and an inclined friction face and a longitudinally extending friction face on the other side thereof, of an outer friction member having a transversely extending interior friction face, a friction plate movable in unison with said member and coöperating with the first named longitudinal friction face of the shell, a combined friction wedge shoe having friction faces coöperable with said member and the inclined friction face of the shell, said wedge shoe having an additional wedge face, another friction shoe having a wedge face coöperable with the additional wedge face of the wedge shoe and provided also with a friction face coöperable with the inner face of said plate, a friction shoe follower coöperable with the last named friction shoe and having also a friction face coöperable with the other longitudinal friction face of the shell, and spring means interposed between said shell and said shoe follower to resist relative movement between the friction elements and the shell.

6. In a friction shock absorbing mechanism, the combination with a friction shell having a longitudinally extending friction face on one side thereof and an inclined friction face and a longitudinally extending friction face on the other side thereof, of an outer friction member having a transversely extending interior friction face, a friction plate movable in unison with said member and coöperating with the first named longitudinal friction face of the shell, a combined friction wedge shoe having friction faces coöperable with said member and the inclined friction face of the shell, said wedge shoe having an additional wedge face, another friction shoe having a wedge face coöperable with the additional wedge face of the wedge shoe and provided also with a friction face coöperable with the inner face of said plate, a friction shoe follower coöperable with the last named friction shoe and having also a friction face coöperable with the other longitudinal friction face of the shell, spring means interposed between said shell and said shoe follower to resist relative movement between the friction elements and the shell, and coöperating means on said plate and shoe follower and shell to limit the inward movement of the friction elements relatively to the shell.

In witness that I claim the foregoing I have hereunto subscribed my name this 17th day of Apr., 1919.

JOHN F. O'CONNOR.